(12) United States Patent
Huang et al.

(10) Patent No.: US 12,292,626 B2
(45) Date of Patent: May 6, 2025

(54) DEVICES AND METHODS FOR LOW VOLTAGE OPTICAL MODULATION

(71) Applicant: THE TRUSTEES OF THE STEVENS INSTITUTE OF TECHNOLOGY, Hoboken, NJ (US)

(72) Inventors: Yuping Huang, Norwood, NJ (US); Yong Meng Sua, Fort Lee, NJ (US); Mingwei Jin, Jersey City, NJ (US); Jiayang Chen, Jersey City, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 260 days.

(21) Appl. No.: 17/923,554

(22) PCT Filed: May 6, 2021

(86) PCT No.: PCT/US2021/031177
§ 371 (c)(1),
(2) Date: Nov. 4, 2022

(87) PCT Pub. No.: WO2021/226395
PCT Pub. Date: Nov. 11, 2021

(65) Prior Publication Data
US 2023/0185119 A1 Jun. 15, 2023

Related U.S. Application Data

(60) Provisional application No. 63/021,012, filed on May 6, 2020.

(51) Int. Cl.
*G02B 27/28* (2006.01)
*G02F 1/03* (2006.01)
(Continued)

(52) U.S. Cl.
CPC ......... *G02F 1/0316* (2013.01); *G02B 27/286* (2013.01); *G02F 1/0305* (2013.01);
(Continued)

(58) Field of Classification Search
CPC .............. B82Y 20/00; G02B 27/286; G02B 2207/101; G02F 1/0305; G02F 1/0316;
(Continued)

(56) References Cited

U.S. PATENT DOCUMENTS 5,850,285 A 12/1998 Hill et al.
6,335,215 B1 * 1/2002 Yuang .............. H01S 5/04254
438/42

(Continued)

FOREIGN PATENT DOCUMENTS

CN 107070651 A1 11/2006
CN 202048988 U 11/2011
(Continued)

OTHER PUBLICATIONS

International Search Report for PCT/US2021/031177 entitled "Devices and Methods for Low Voltage Optical Modulation" mailed on Jul. 22, 2021, 4 pages.

(Continued)

*Primary Examiner* — Ryan A Lepisto
(74) *Attorney, Agent, or Firm* — Clark Hill PLC; Ralph W. Selitto; John K. Kim

(57) ABSTRACT

An electro-optic modulation structure 110, a method for fabrication of the electro-optic modulation structure, and a method of optical modulation derived from an electro-optic modulation structure with low voltage of operation are disclosed. The low voltage operation of the electro-optic modulator is realized by designed electro-optic modulation structures that include the light confining waveguide 114, overclad layer 120 and modulating electrode structure 116

(Continued)

for applying modulation voltages that are directed towards a low voltage operation of the electro-optic modulation 110 device upon consideration of optimal optical loss.

18 Claims, 14 Drawing Sheets

(51) Int. Cl.
  *G02F 1/035* (2006.01)
  *G02F 1/225* (2006.01)
  *B82Y 20/00* (2011.01)
  *G02F 1/31* (2006.01)
(52) U.S. Cl.
  CPC .............. *G02F 1/035* (2013.01); *G02F 1/2257* (2013.01); *B82Y 20/00* (2013.01); *G02B 2207/101* (2013.01); *G02F 1/31* (2013.01); *G02F 2203/15* (2013.01)
(58) Field of Classification Search
  CPC .......... G02F 1/035; G02F 1/2257; G02F 1/31; G02F 2203/15
  See application file for complete search history.

(56) References Cited

U.S. PATENT DOCUMENTS

| | | | |
|---|---|---|---|
| 6,480,265 B2 | 11/2002 | Maimon et al. | |
| 6,483,592 B2 | 11/2002 | Pedigo | |
| 6,583,510 B2* | 6/2003 | Hanamaki | H01L 29/456 |
| | | | 257/E29.143 |
| 6,618,411 B1* | 9/2003 | Takiguchi | H01S 5/22 |
| | | | 372/45.01 |
| 6,711,192 B1* | 3/2004 | Chikuma | H01S 5/32341 |
| | | | 372/43.01 |
| 7,072,374 B2* | 7/2006 | Matsumura | H01S 5/04252 |
| | | | 372/43.01 |
| 7,095,926 B2* | 8/2006 | Sugiyama | G02F 1/2255 |
| | | | 385/39 |
| 7,525,123 B2* | 4/2009 | Kotani | H01S 5/34333 |
| | | | 257/40 |
| 7,567,596 B2 | 7/2009 | Dantus et al. | |
| 7,751,456 B2* | 7/2010 | Kawasaki | H01S 5/22 |
| | | | 438/689 |
| 7,852,892 B2* | 12/2010 | Hosoi | H01S 5/223 |
| | | | 372/44.011 |
| 8,072,609 B1 | 12/2011 | Trivedi et al. | |
| 8,232,125 B2* | 7/2012 | Hatori | H01S 5/22 |
| | | | 257/E25.019 |
| 8,309,929 B2 | 11/2012 | Bond et al. | |
| 8,339,581 B2 | 12/2012 | Guha et al. | |
| 8,526,478 B2* | 9/2013 | Ishimura | H01S 5/026 |
| | | | 372/50.1 |
| 8,621,931 B2 | 1/2014 | Phua et al. | |
| 8,665,923 B2 | 3/2014 | Sprangle et al. | |
| 8,724,933 B2* | 5/2014 | Takagi | H04B 10/5561 |
| | | | 385/3 |
| 8,761,606 B2 | 6/2014 | Habif | |
| 8,774,565 B2* | 7/2014 | Kissa | G02F 1/2255 |
| | | | 385/2 |
| 9,110,315 B2* | 8/2015 | Nakanishi | H01S 5/0265 |
| 9,244,296 B2* | 1/2016 | Iwatsuka | G02F 1/035 |
| 9,281,656 B2* | 3/2016 | Mueller | H01S 5/2232 |
| 9,596,421 B1 | 3/2017 | Itzler | |
| 9,696,133 B2 | 7/2017 | Yuan et al. | |
| 9,746,743 B1* | 8/2017 | Rabiei | G02B 6/12009 |
| 9,945,948 B2 | 4/2018 | Yang et al. | |
| 10,860,746 B2 | 12/2020 | Foster et al. | |
| 10,892,597 B2* | 1/2021 | Hagino | H01S 5/343 |
| 10,989,980 B2* | 4/2021 | Iwatsuka | G02F 1/2255 |
| 11,003,046 B2 | 5/2021 | Liscidini | |
| 11,011,887 B2* | 5/2021 | Gerhard | H01S 5/22 |
| 11,226,531 B2* | 1/2022 | Iwatsuka | G02F 1/225 |
| 11,264,775 B2 | 3/2022 | Huang | |
| 11,442,697 B2 | 9/2022 | Huang et al. | |
| 11,693,180 B2* | 7/2023 | Bahadori | G02F 1/0018 |
| | | | 385/14 |
| 11,693,290 B2* | 7/2023 | Makino | G02F 1/035 |
| | | | 385/1 |
| 11,914,233 B2* | 2/2024 | Sugiyama | G02F 1/212 |
| 12,078,877 B2* | 9/2024 | Sugiyama | G02F 1/035 |
| 2002/0097962 A1 | 7/2002 | Yoshimura et al. | |
| 2002/0141679 A1* | 10/2002 | Doi | G02F 1/2255 |
| | | | 385/2 |
| 2004/0136634 A1 | 7/2004 | Chowdhury et al. | |
| 2005/0123242 A1 | 6/2005 | Walker et al. | |
| 2005/0175271 A1* | 8/2005 | Sugiyama | G02F 1/2255 |
| | | | 385/39 |
| 2006/0067634 A1* | 3/2006 | Bull | G02B 6/14 |
| | | | 385/27 |
| 2006/0083379 A1 | 4/2006 | Brookner | |
| 2006/0187988 A1* | 8/2006 | Tanaka | H01S 5/2231 |
| | | | 372/45.01 |
| 2006/0245680 A1 | 11/2006 | Rasmussen et al. | |
| 2007/0041413 A1* | 2/2007 | Kwak | H01S 5/22 |
| | | | 372/46.01 |
| 2008/0138087 A1 | 4/2008 | Jiang et al. | |
| 2008/0197377 A1* | 8/2008 | Sudo | H01S 5/2231 |
| | | | 257/E33.006 |
| 2009/0046296 A1 | 2/2009 | Kilpatrick et al. | |
| 2010/0124787 A1 | 5/2010 | Nitkowski et al. | |
| 2012/0058585 A1* | 3/2012 | Maegawa | H01S 5/2201 |
| | | | 257/E33.013 |
| 2013/0036145 A1 | 2/2013 | Pruneri | |
| 2013/0308667 A1* | 11/2013 | Hagino | H01S 5/02469 |
| | | | 372/44.01 |
| 2014/0098955 A1 | 4/2014 | Hughes | |
| 2014/0192363 A1 | 7/2014 | Kippenberg et al. | |
| 2015/0323450 A1 | 11/2015 | Lipson et al. | |
| 2016/0234017 A1 | 8/2016 | Englund | |
| 2017/0131388 A1 | 5/2017 | Campbell et al. | |
| 2018/0241480 A1 | 8/2018 | Hughes | |
| 2020/0257502 A1 | 8/2020 | Steinle | |
| 2020/0274703 A1 | 8/2020 | Lukens | |
| 2020/0285131 A1 | 9/2020 | Marandi et al. | |
| 2021/0080805 A1 | 3/2021 | Srinivasan et al. | |
| 2021/0156684 A1 | 5/2021 | Huang | |
| 2021/0247662 A1 | 8/2021 | Dorche et al. | |
| 2021/0278728 A1* | 9/2021 | Kumar | G02F 1/225 |
| 2021/0286203 A1* | 9/2021 | Safian | G02B 6/13 |
| 2022/0075238 A1 | 3/2022 | Huang et al. | |
| 2023/0079367 A1 | 3/2023 | Huang et al. | |
| 2023/0155823 A1 | 5/2023 | Huang et al. | |
| 2023/0168563 A1 | 6/2023 | Huang et al. | |

FOREIGN PATENT DOCUMENTS

| | | |
|---|---|---|
| CN | 107528686 A | 12/2017 |
| CN | 111897054 A | 11/2020 |
| EP | 3477362 A1 | 5/2019 |
| EP | 3286603 B1 | 2/2020 |
| GB | 2510916 A | 4/2015 |
| JP | 4091956 B2 | 5/2008 |
| KR | 101899026 B1 | 10/2018 |
| WO | 2013112351 A2 | 8/2013 |
| WO | 2018031916 A1 | 2/2018 |
| WO | 2019241582 A1 | 6/2020 |
| WO | WO2021231794 A1 | 11/2021 |
| WO | WO2023004148 A1 | 1/2023 |

OTHER PUBLICATIONS

Written Opinion for PCT/US2021/031177 entitled "Devices and Methods for Low Voltage Optical Modulation" mailed on Jul. 22, 2021, 6 pages.

PCT International Preliminary Report on Patentability for PCT/US2021/031177 entitled "Devices and Methods for Low Voltage Optical Modulation" mailed on Nov. 8, 2022, 7 pages.

(56) References Cited

OTHER PUBLICATIONS

Jason Lin et al., "Quantum private comparison of equality protocol without a third party", arxiv. org, vol. 13, No. 2, Oct. 1, 2013, pp. 239-247.
Goorden, Sebastianus & Horstmann, Marcel & Mosk, Allard & Skoric, Boris & Pinkse, Pepijn. (2013), "Quantum-Secure Authentication with a Classical Key".
Arapinis et al., "Quantum Physical Unclonable Functions: Possibilities and Impossibilities." Jun. 15, 2022, Quantum 5, 475 (2021). arXiv:1910.02126v4.
F. Xu, "Experimental fast quantum random No. generation using high-dimensional entanglement with entropy monitoring", Optica 3, 1266-1269 (2016).
Hochrainer, Armin, "Low-Loss Optical Elements for a Loophole-Free Bell Test", 2014 (Thesis).
Lee, H., Chen, T., Li, J. et al., "Ultra-low-loss optical delay line on a silicon chip", Nat. Commun. 3, 867 (2012). https://doi.org/10.1038/ncomms1876.
Fiorentino, Marco & Munro, William & Santori, Charles & Spillane, Sean & Beausoleil, Ray. (2006), "II-Fiber-Optic Quantum Random No. Generator", 1-2. 10.1109/CLEO.2006.4628717.
Nguyen L, Rehain P, Sua YM, Huang YP., "Programmable quantum random number generator without postprocessing", Opt. Lett. Feb. 15, 2018;43(4):631-634. doi: 10.1364/OL.43.000631. PMID: 29444039.
Nguyen, Lac & Rehain, Patrick & Sua, Yong Meng & Huang, Yu-Ping. (2018), "Quantum Random Number Generator with Programmable Probability Distributions", JTu3A.30. 10.1364/FIO.2018. JTu3A.30.
Kumar, S., Zhang, H. & Huang, YP., "Large-scale Ising emulation with four body interaction and all-to-all connections", Commun. Phys. 3, 108 (2020). https://doi.org/10.1038/s42005-020-0376-5.
D. Pierangeli, G. Marcucci, and C. Conti, "Large-Scale Photonic Ising Machine by Spatial Light Modulation", Phys. Rev. Lett. 122, 213902—Published May 31, 2019.
Roques-Carmes, C., Shen, Y., Zanoci, C. et al. "Heuristic recurrent algorithms for photonic Ising machines", Nat. Commun. 11, 249 (2020). https://doi.org/10.1038/s41467-019-14096-z.
Shahverdi A, Sua YM, Dickson I, Garikapati M, Huang YP., "Mode selective up-conversion detection for LIDAR applications", Opt Express. Jun. 11, 2018;26(12):15914-15923. doi: 10.1364/OE.26.015914. PMID: 30114845.
Geiser, P., Willer, U., Walter, D., and Schade, W., "A subnanosecond pulsed laser-source for mid-infrared LIDAR", Applied Physics B: Lasers and Optics, vol. 83, No. 2, pp. 175-179, 2006. doi:10.1007/s00340-006-2158-5.
Shahverdi, Amin & Sua, Yong Meng & Tumeh, Lubna & Huang, Yu-Ping. (2017). "Quantum Parametric Mode Sorting: Beating the Time-Frequency Filtering", Scientific Reports. 7. 10.1038/s41598-017-06564-7.
J. Lu, J. Surya, X. Liu, A. Bruch, Z. Gong, Y. Xu, and H. Tang, "Periodically poled thin-film lithium niobate microring resonators with a second-harmonic generation efficiency of 250,000%/W," Optica 6, 1455-1460 (2019).
Fu. Y., Guo, M., & Phua, P. B. (2010), "Spatially encoded multibeam laser Doppler vibrometry using a single photodetector", Optics Letters, 35(9), 1356-1358.
Yanlu Li, Jinghao Zhu, Matthieu Duperron, Peter O'Brien, Ralf Schüler, Soren Aasmul, Mirko de Melis, Mathias Kersemans, and Roel Baets, "Six-beam homodyne laser Doppler vibrometry based on silicon photonics technology," Opt. Express 26, 3638-3645 (2018).
Patrick Rehain, Jeevanandha Ramanathan, Yong Meng Sua, Shenyu Zhu, Daniel Tafone, and Yu-Ping Huang, "Single-photon vibrometry," Opt. Lett. 46, 4346-4349 (2021).
Jiuyi Zhang, Yong Meng Sua, Jia-Yang Chen, Jeevanandha Ramanathan, Chao Tang, Zhan Li, Yongxiang Hu, Yu-Ping Huang; "Carbon-dioxide absorption spectroscopy with solar photon counting and integrated lithium niobate micro- ring resonator", Appl. Phys. Lett. Apr. 26, 2021; 118 (17): 171103. https://doi.org/10.1063/5.0045869.
Tri Cao Doan, "Resonant Matter Wave Amplification in Mean Field Theory", arXiv: 1112.3325v1 Quantum Gases, Dec. 14, 2011.
Hu, Yi & Siviloglou, Georgios & Zhang, Peng & Efremidis, Nikolaos & Christodoulides, Demetrios & Chen, Zhigang. (2012), "Self-accelerating Airy Beams: Generation, Control, and Applications", 10.1007/978-1-4614-3538-9_1.
Yu-Ping Huang and Prem Kumar, "Mode-resolved photon counting via cascaded quantum frequency conversion," Opt. Lett. 38, 468-470 (2013).
Abijith S. Kowligy, Paritosh Manurkar, Neil V. Corzo, Vesselin G. Velev, Michael Silver, Ryan P. Scott, S. J. B. Yoo, Prem Kumar, Gregory S. Kanter, and Yu-Ping Huang, "Quantum optical arbitrary waveform manipulation and measurement in real time," Opt. Express 22, 27942-27957 (2014).
Jingle Liu, Jianming Dai, See Leang Chin, and X.-C. Zhang, "Broadband terahertz wave remote sensing using coherent manipulation of fluorescence from asymmetrically ionized gases," Nature Photonics, vol. 4, (Sep. 2010).
R. Sferopoulos, "A Review of Chemical Warfare Agent (CWA) Detector Technologies and Commercial-Off-The-Shelf Items," DSTO Defence Science and Technology Organisation, Fishermans Bend, Victoria, Australia (2009).
Scully, et al., "Quantum Optics," Published by Cambridge University Press, 1997.
Huang, et al., "Heralding single photons without spectral factorability", Phys. Rev. A 82, 043826 (2010).
Seth Lloyd, "Enhanced Sensitivity of Photodetection via Quantum Illumination", Science321, 1463-1465(2008), DOI: 10.1126/science.1160627.
U.S. Appl. No. 17/899,493, filed Aug. 30, 2022, titled Approaches, Apparatuses, and Methods for Non-Interferometric Quantum Photonics Vibrometry. Yuping Huang et al.

* cited by examiner

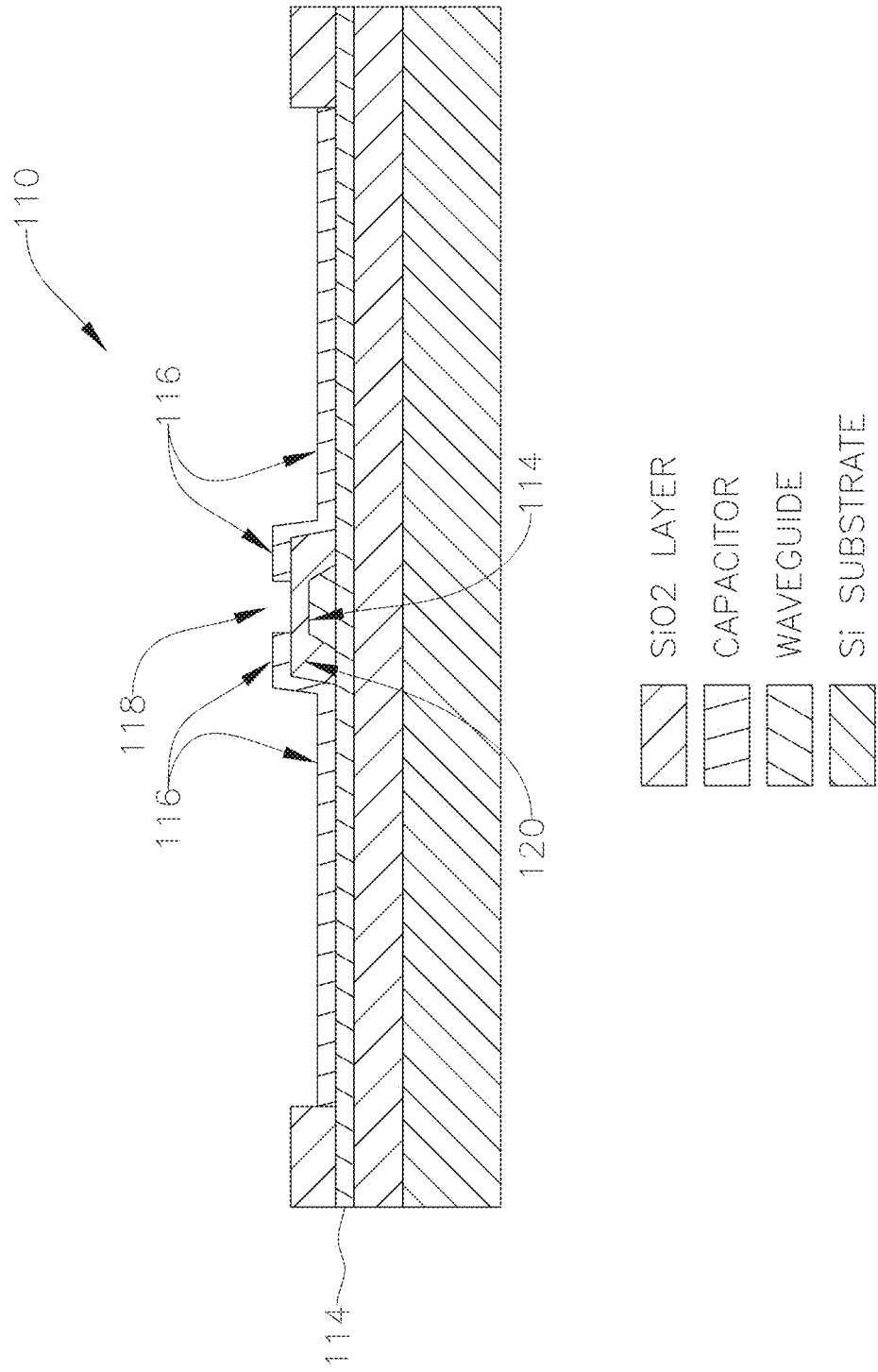

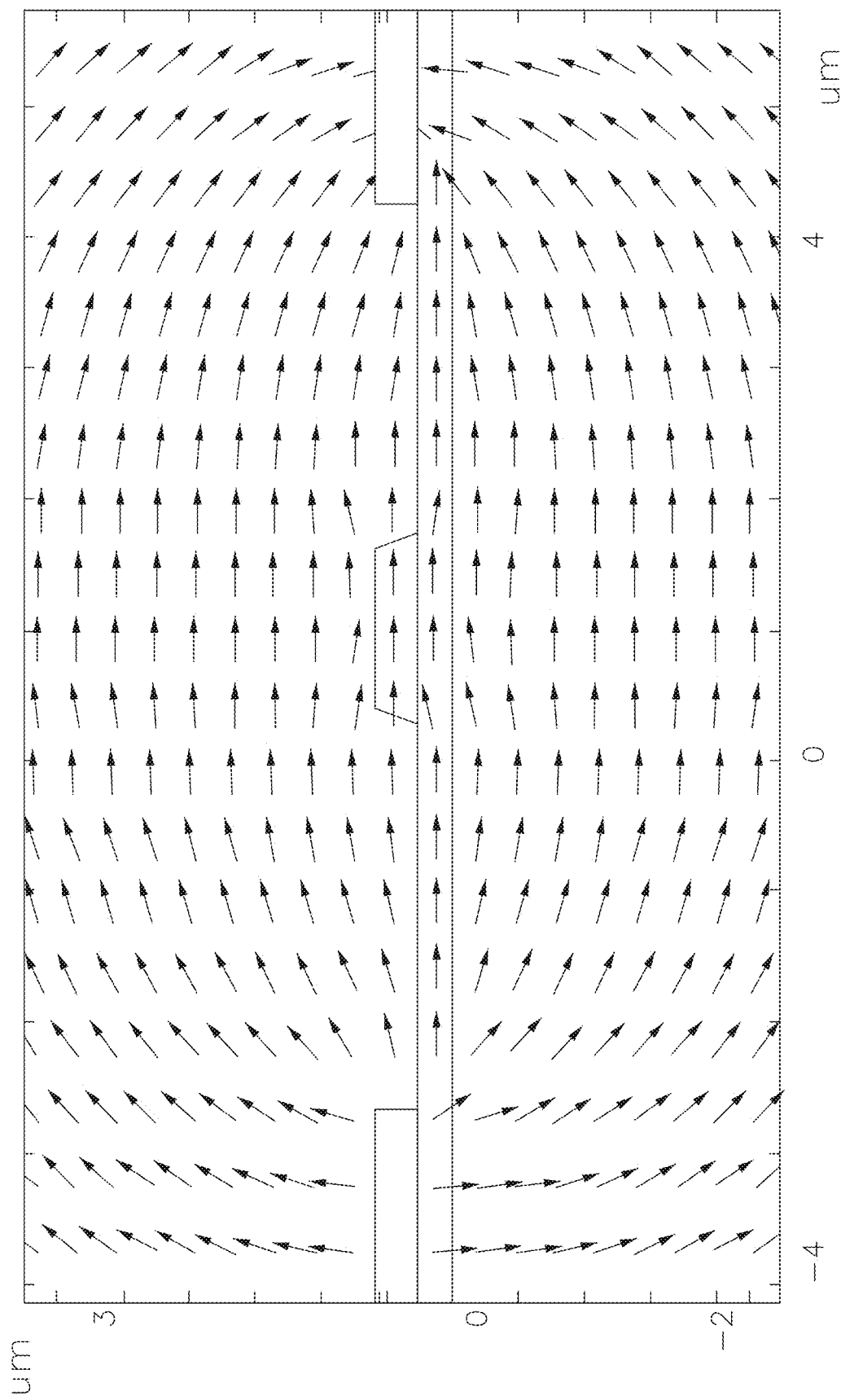

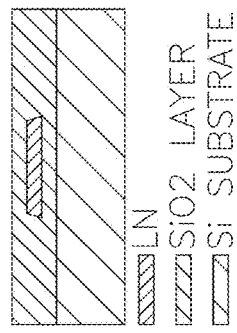 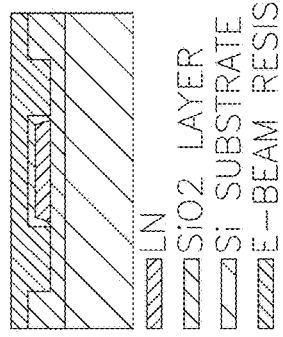

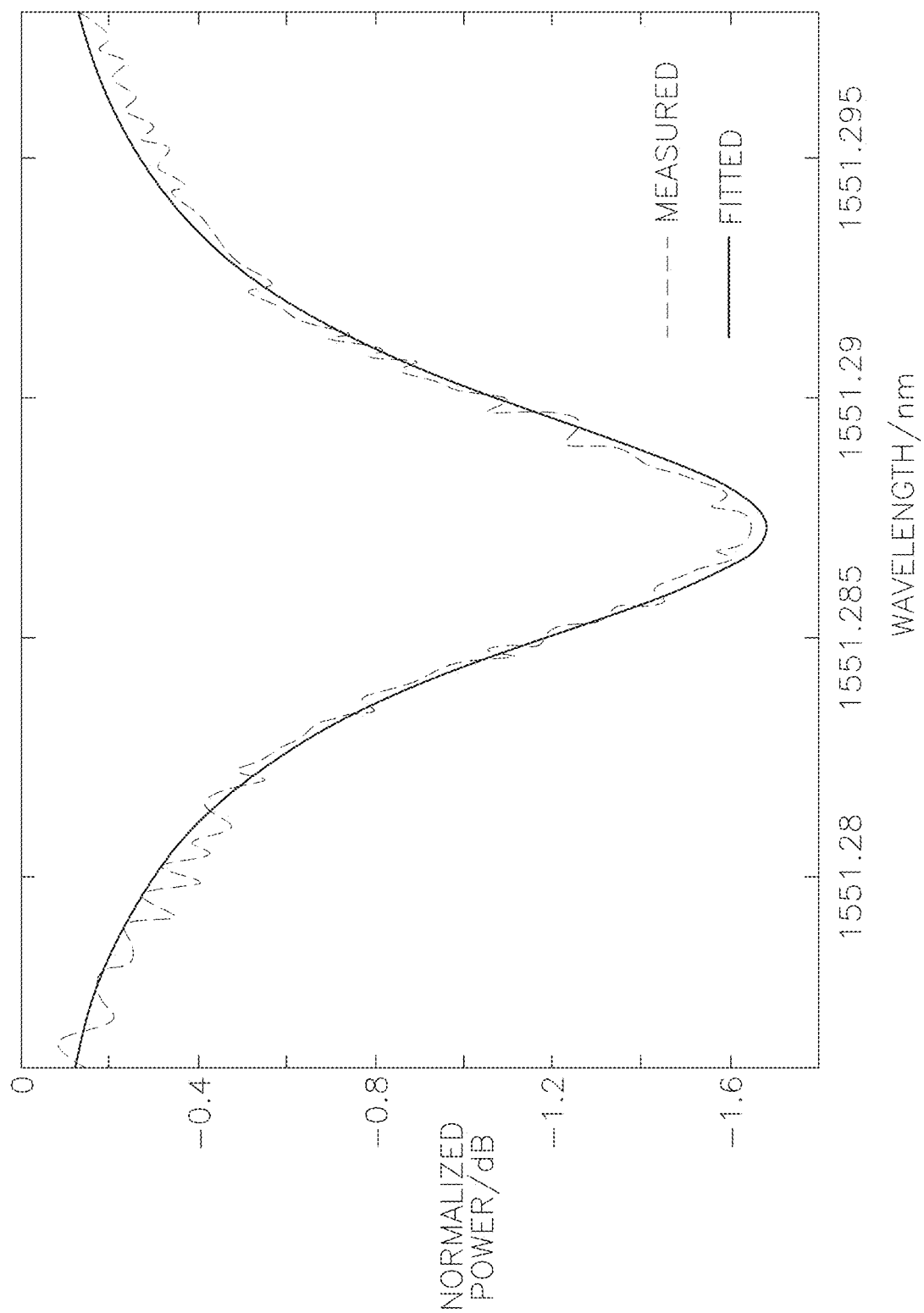

DEVICES AND METHODS FOR LOW VOLTAGE OPTICAL MODULATION

CROSS-REFERENCE TO RELATED APPLICATIONS

This application is a U.S. National Phase entry under 35 U.S.C. 371 and claims priority to International Patent Application No. PCT/US2021/031177 filed on May 6, 2021 which claims priority to U.S. Provisional Patent Application Ser. No. 63/021,012 filed May 6, 2020, the entire disclosure of each of said applications being incorporated herein by reference.

STATEMENT REGARDING FEDERALLY SPONSORED RESEARCH

This invention was made with government support under contract number W15QKN-18-D-0040 awarded by The Army Contracting Command—NJ. The government has certain rights in the invention.

FIELD OF THE INVENTION OR TECHNICAL FIELD

The present invention relates to electro-optic systems.

BACKGROUND OF THE INVENTION

Electro-optic devices are crucial in transforming radio frequency (RF) and electronic signals into the optical domain and vice versa, serving as the key components in optical interconnections in telecommunication systems and data centers, RF photonics, 5G infrastructure, beam steering, and quantum photonics. Electro-optic devices with low operation voltage at small scale, including, but not limited to, electro-optic phase shifters and modulators are important for the integration of electro-optic devices with, for example, lithium niobate thin film on various monolithic and heterogeneous integrated photonics platforms. In particular, high voltage and energy efficient electro-optic devices are essential for addressing the future bandwidth demands of modern communication systems utilizing advanced modulation formats and coherent detection schemes that encode data onto both the amplitude and phase of optical signals. The realization of low voltage electro-optic devices can significantly reduce the energy consumption, physical footprint and complexity of electro-optic circuits that include the electro-optic devices and corresponding electronic driving circuits.

SUMMARY OF THE INVENTION

A low voltage-drive Electro-optic modulator (EOM) on monolithic Lithium Niobate thin film is disclosed. The light is modulated in phase by electronic fields through electro-optical effects, or modulated in amplitude by the interference effect due to phase differences created by the electric field applied onto a modulation arm in an interferometer setting. The low modulation voltage and short footprint of the invented EOM are enabled by the ultra-efficient electro-optic phase shifter in the modulation arm. The phase shifter is surrounded by the metal layer to enhance the electric field density and optimize the overlap between the electric and optical field in the waveguide.

The present invention may be used for improving the energy efficiency of various electro-optical-based devices and systems, such as those used in telecommunication and data centers supporting ever increasing network traffic, cloud computing and storage. The invention could be used for energy-efficient coherent modulators for high-speed communication networks with complex, nested Mach-Zehnder modulators made using photonic integrated circuits on lithium niobate. By offering electro-optic phase modulation in a resonator, the present invention enables electro-optic frequency comb generation as a tool for optical communication, precision metrology, timing and spectroscopy. The present invention can be used to detect radio waves or microwaves with high sensitivity. By guiding the radio waves or microwaves to an electro-optic activated interferometer with coherent optical signal inputs, a small phase shift caused by the radio waves or microwaves can lead to the optical intensity change in the interferometer, thus realizing optical reading of the radio waves and/or microwaves. Additionally, the present invention could be used for optical routing and switch operation for optical interconnections in data centers or cloud storage facilities.

The present invention reduces the half-wave voltage, or the voltage required to induce a phase change of $\pi$ for the light going through a waveguide, thus significantly reducing the energy required to operate the devices and systems.

The present invention presents a design with optimized placement of the electrodes, where the generated electric field density is much higher while improving the overlap between the electric and optical fields in the waveguide. Specifically, novel electrode design and placement allows for controlled generation of high-density electric fields in the desirable waveguide region.

The present invention implements a novel design of the electrodes which is advantageous in providing key fundamental improvements in electric field density and electric-optical field overlaps while maintaining low waveguide loss and small device footprint. This invention overcomes the tradeoff of modulation voltage and modulation length of a conventional electro-optics modulator. The present invention is fabricated with a standard semiconductor processing process on a monolithic lithium niobate platform, thus making it compatible with established large-scale silicon wafer processes for mass production with high yield and high reliability.

BRIEF DESCRIPTION OF FIGURES

For a better understanding of the present invention, reference is made to the following detailed description of various exemplary embodiments considered in conjunction with the accompanying drawings, in which like structures are referred to by the like reference numerals throughout the several views, and in which:

FIG. 3 shows a cross-section of an ultra-efficient phase shifter in accordance with an embodiment of the present invention, the waveguide being surrounded by a gold layer with a small top gap and separated by an $SiO_2$ buffer layer;

FIG. 13B is a graph of resonance measurements for an electrode-deposited resonator fabricated in accordance with an embodiment of the present invention.

DETAILED DESCRIPTION OF VARIOUS EMBODIMENTS

Figure 1:
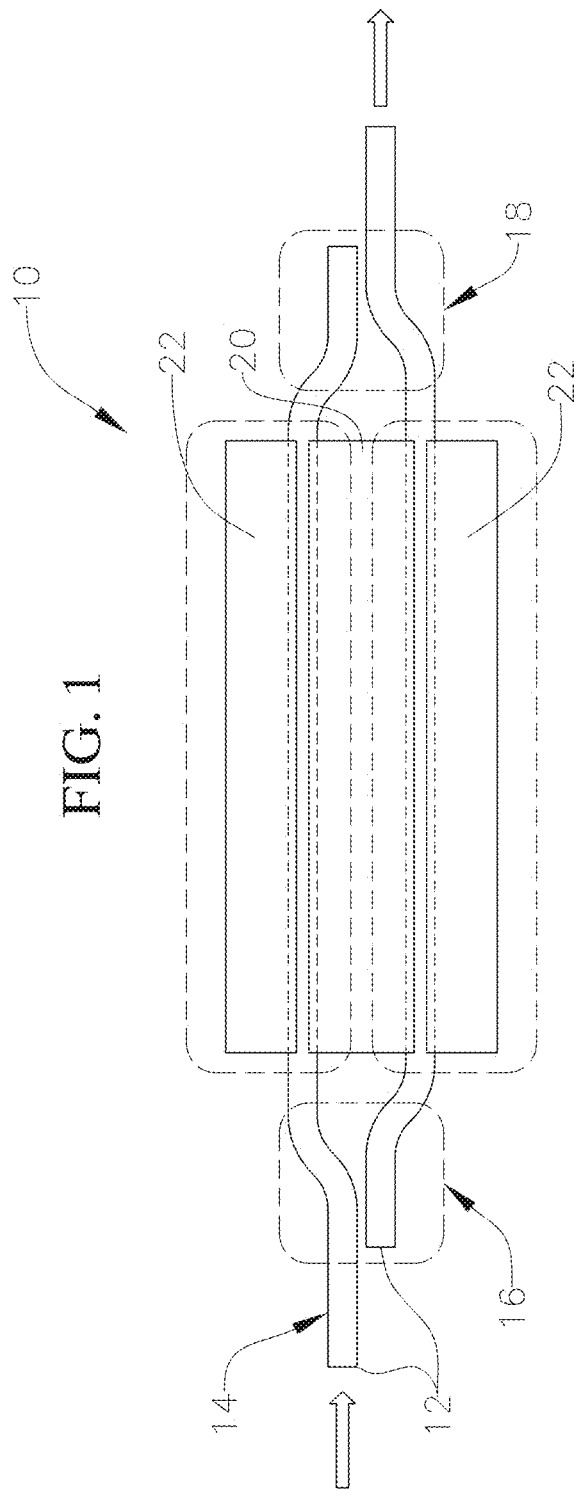
FIG. 1 shows an electro-optic modulator structure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, and some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or described subject matter is intended to be construed as not being limited to any example embodiments set forth herein; exemplary embodiments are provided merely to be illustrative. Among other things, for example, subject matter may be embodied as methods, devices, components, or systems. The following detailed description is, therefore, not intended to be taken in a limiting sense.

Throughout the specification and/or claims, terms may have nuanced meanings suggested or implied in context beyond an explicitly stated meaning. Likewise, the phrase "in one embodiment" as used herein does not necessarily refer to the same embodiment and the phrases "in another embodiment" and "other embodiments" as used herein do not necessarily refer to a different embodiment. It is intended, for example, that covered or claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

A Mach-Zehnder interferometer (MZI) 10 with its arms 12 sandwiched by electrodes 12 is shown in FIG. 1. 1550 nm light (or light at a different wavelength) is coupled into the waveguide 14 at the input and split into two arms through a beam splitter 16, before being combined and interfered through a beam combiner 18. The central signal pad 20 and the other two ground pads 22 form a coplanar capacitor. When applying a voltage onto the signal pad 20 and grounding the other two pads 22, the electric fields with the opposite directions are generated between the two gaps. Due to electro-optic effect of the Lithium Niobate (LN) material that the waveguide is made of, the refractive index of the waveguide can be either increased or reduced in response to the electric field intensity and directions. Thereby, a controllable relative phase difference is introduced between the beams in the two arms. As a result, the light at the combiner is interfered either constructively or destructively due to the amount of the phase difference, resulting in the modulation of optical intensity.

Figure 2:
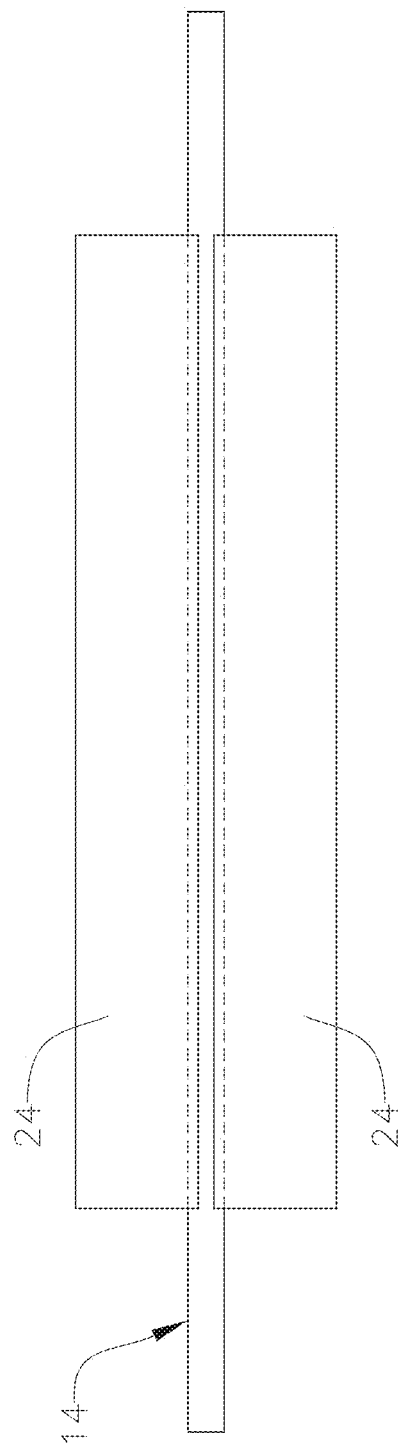
FIG. 2 shows a top view of a phase shifter.

The modulation arm of an EOM is shown in FIG. 2. By itself, it can also serve as an optical phase shifter independently, with applications in telecommunications, data centers, and electro-optics. For a traditional optical phase shifter, the electrodes 24 are set on both sides of a waveguide 14 where light passes through. The waveguide 14 is etched from the commercial x-cut LN thin film bonded on Silicon substrate (not shown). Due to its strong Pockels effect (electro-optic effect), the refractive index of the waveguide will be changed when applying the horizontal electric field across the waveguide. The refractive index of the waveguide can be either increased or decreased regarding to which direction of electric field is applied. A certain distance between the electrodes 24 is set in order to minimize the optical absorption from the metal pads while ensuring strong electric field in the overlapping region with optical field. To achieve as high modulation efficiency as possible, the structure needs to be designed to use the largest component of the second order electro-optic coefficient (e.g., 30.9 pm/V). This includes to design a waveguide perpendicular to the LN crystal line and use the horizontal component (relative to the chip) of the electric field to modulate transverse electric (TE) mode of light. To reduce the $\pi$-shift voltage, which is done when applying such voltage, the phase difference between the two arms of MZI is shifted from 0 to $\pi$, one can either make modulation arms longer or increase electric field intensity. However, it is usually not practical to make the modulation arms long enough for the following reasons: First, optical absorption loss due to the metal electrode and waveguide's propagation losses are proportional to the length. Additionally, longer electrodes limit the modulation speed to below tens of GHz. Finally, a larger footprint is not compatible with large-scale integration. On the other hand, it is also not possible to narrow the gaps between the signal and ground pads to increase the electric field intensity because this will increase the optical absorption loss induced by the metal.

Figure 4B:
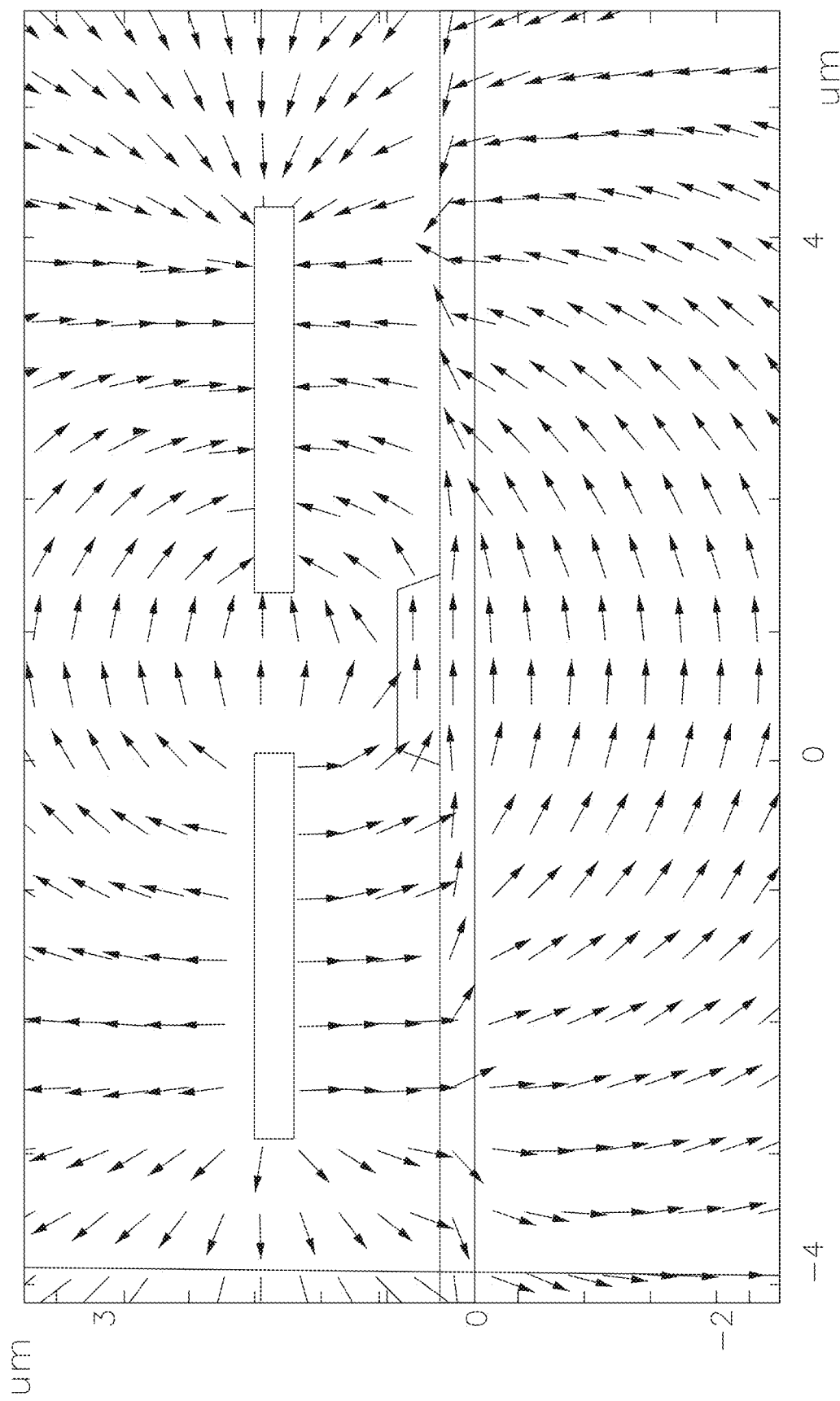
FIG. 4 depicts the simulation results of electric field lines generated by (a) base capacitor and (B) top capacitor.
Figure 5A:
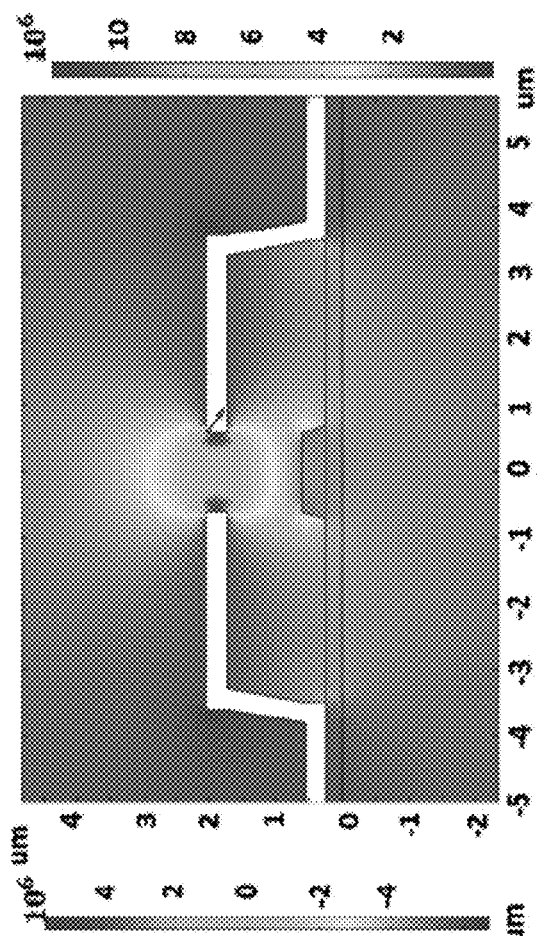
FIG. 5 depicts simulation results of the horizontal component of electric field intensity of (A) a traditional capacitor and (B) the inventive capacitor.
Figure 5B:
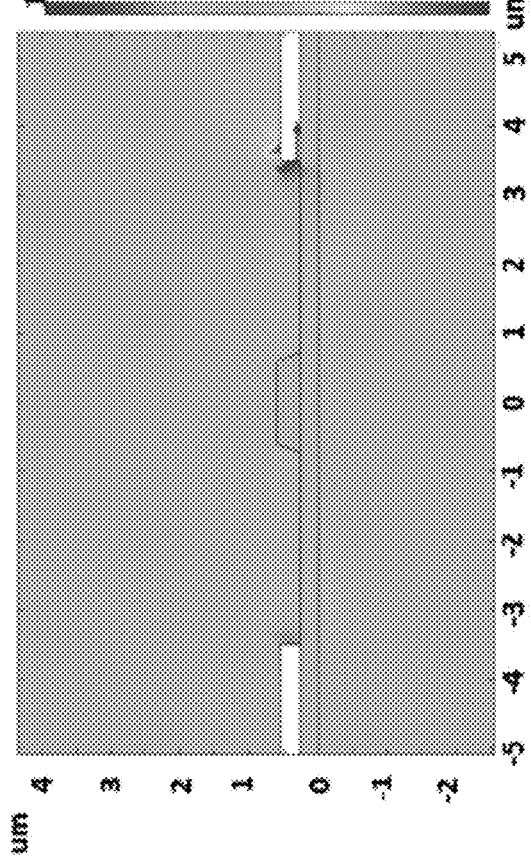
Figure 6:
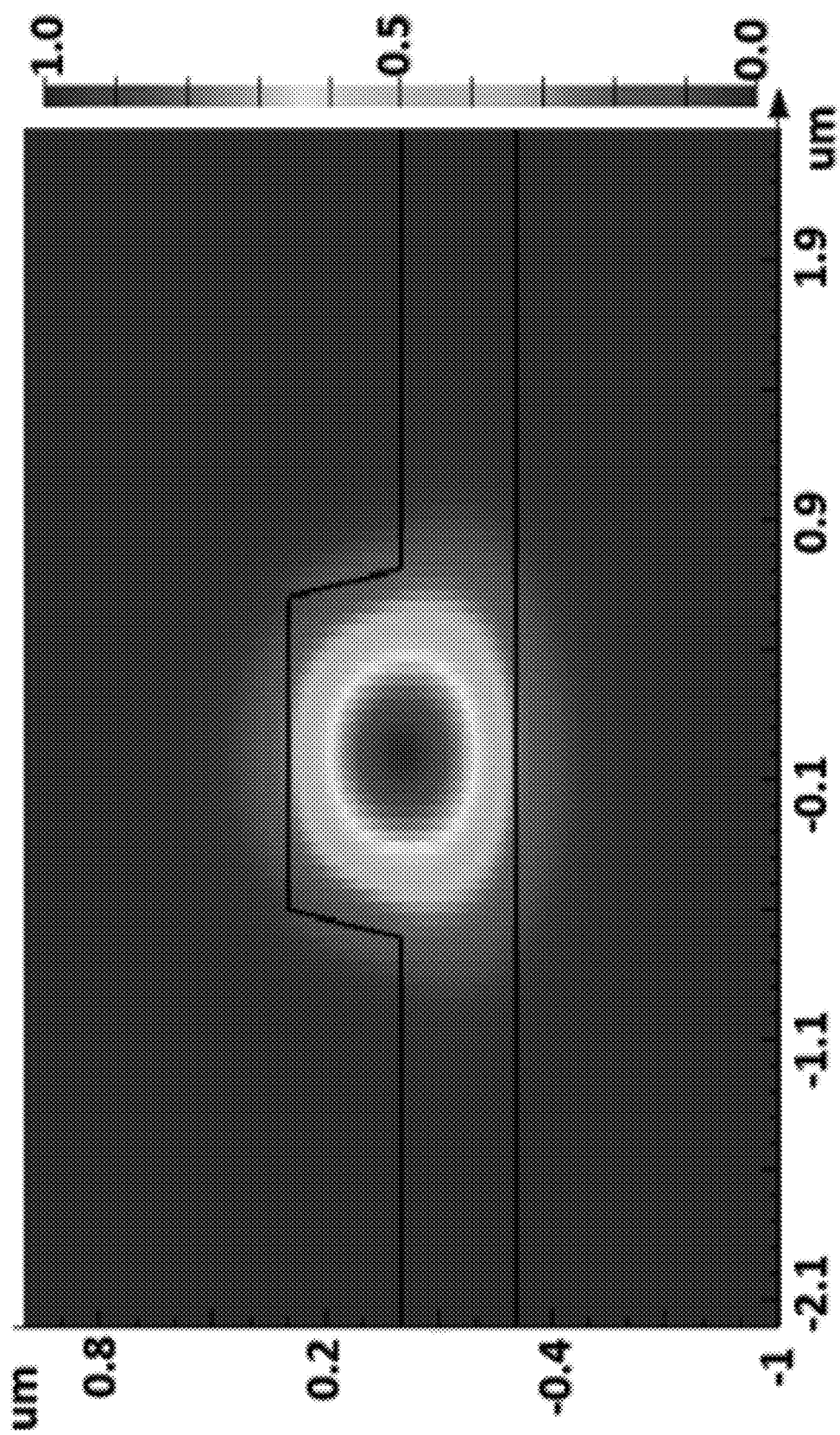
FIG. 6 depicts the simulation result of the optical mode in Lithium Niobate ridge waveguide.

In the inventive structure 110, to increase the modulation efficiency, the metal layer (i.e., electrode) 116 is designed to surround the waveguide 114 with only a small gap 118 on the top of it in order to separate signal and ground. The metal layer 116 and waveguide 114 are separated by a SiO2 buffer layer (i.e., cladding layer) 120 to prevent absorption loss. Contrary to the traditional structure wherein the metal layer is only placed on the sides of the waveguide, the inventive design can considerably enhance the electric field intensity in the waveguide given the same voltage. FIG. 3 shows the cross section of a phase shifter (i.e., electro-optic modulator) with an electrode design in accordance with an embodiment of the present invention. The surrounding metal layers 116 form two capacitors, and both of capacitors generate horizontal components of the electric field in the LN waveguide 114. FIG. 4 shows the simulated electric field lines formed by the base and top capacitors. The electric fields inside the waveguide are along the same direction, which enables coherent modulation of the optical field. From the simulation, the metal on the side wall of the waveguide as shown in FIG. 2 does not further induce the electric field. In accordance with vector addition, when putting the two capacitors together, the horizontal component of electric field intensity will be increased. FIG. 5 simulates horizontal components of electric field intensity for the traditional case and a case made in accordance with an embodiment of the present invention. In the simulation, the gap of the base capacitor is assumed as 7 um, while the top of the top capacitor is 1.2 um. The top width of the waveguide is 1.2 um, and the etching depth of it is 300 nm, leaving a remaining 300 nm LN base layer. The input voltage is assumed to be 10 volts. As a result, the simulated horizontal component of electric field intensity at the center of waveguide is about $7.1*10^6$ volt/meter and $1.6*10^7$ volt/meter respectively, showing that the electric field intensity is two-fold higher when compared to the traditional phase shifter. FIG. 6 is the simulation of optical mode distribution in the ridge waveguide.

As an example of such proposed electro-optic modulator structures, a ridge waveguide with top height of 300 nm and base height of 300 nm may be used. The width of the waveguide is 1200 nm. In some embodiments, waveguide dimensions can be varied depending on the applications. The directional coupler is used as a coupler and combiner to ensure high modulation depth. The buried $SiO_2$ layer is 3 um, and the cladding $SiO_2$ layer is 800 nm. The coplanar electrodes are placed both on the sides and the top of the waveguide, with a base gap of 7 um and top gap of 1.2 um. The lengths of the arms are set as 2 mm, 4 mm and 7.5 mm respectively. The signal is applied on the central electrode while the ground is applied on the other two electrodes so the electric fields created on the two arm waveguides are opposite, and the refractive index change and phase difference are opposite. The π-shift voltage of the proposed electro-optic modulator is measured to be as low as 2.4 volts.

Figure 7:
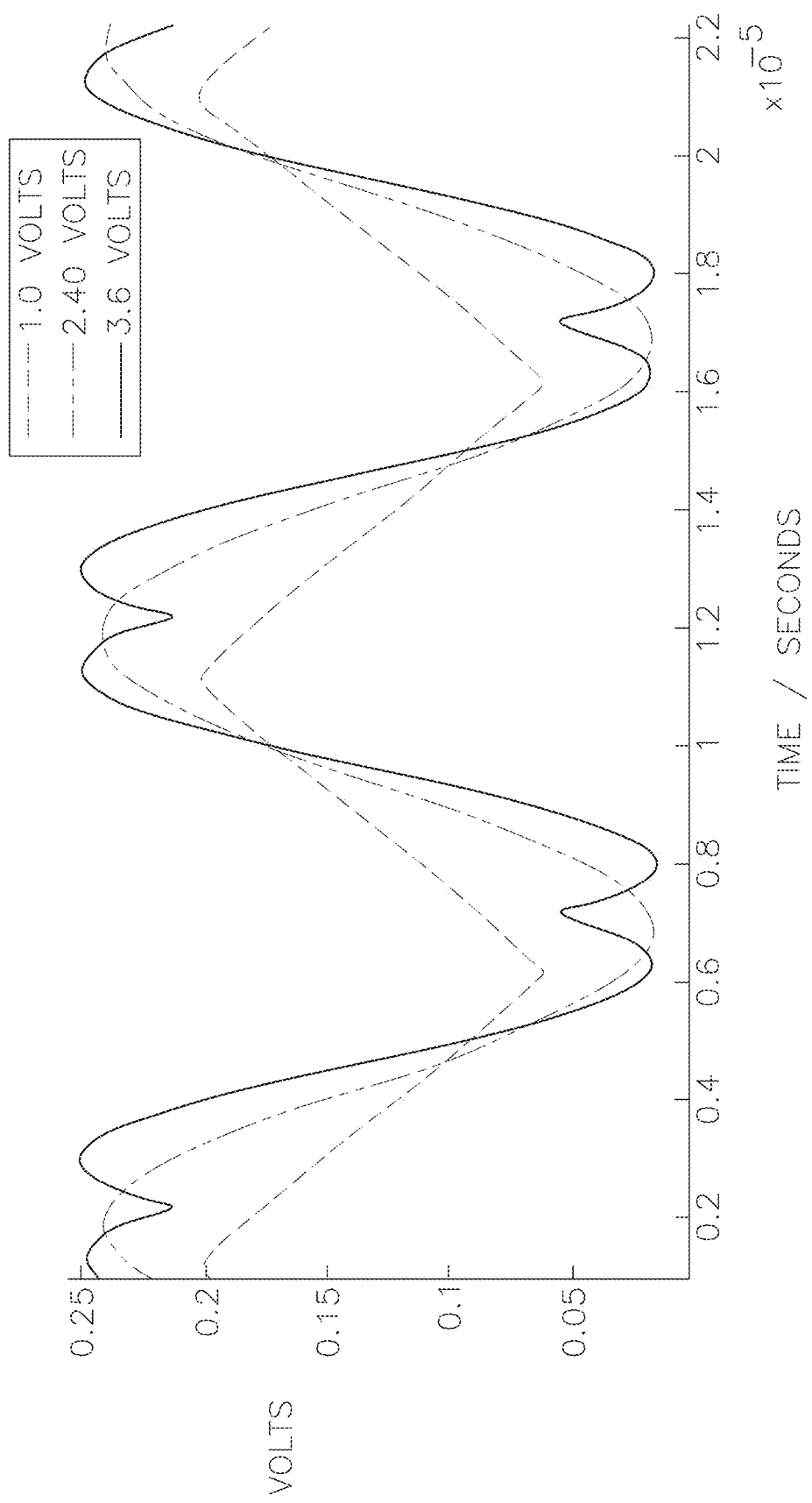
FIG. 7 shows the EOM response when applying triangle waves.

To verify the enhancement, the π-shift voltage for the modulators was measured with different top gaps. As illustrated in Table 1, the top electrode gap was varied between 1.2 um and 6 um. With 4-mm long modulation length, the π-shift voltage drops from 6.96 volts down to 3.3 volts. With 7.5 mm long modulation length and 1.2 um top gap, a lower π-shift voltage is achieved as around 2.4 volts. The different responses of EOM are shown in FIG. 7 when applying the electric triangle waves with different peak-to-peak voltages. As seen in FIG. 7, the EOM works in the linear region when applying a 1 volt triangle wave. When the voltage is increased to 2.4 volts, the EOM behaves as a sinusoidal wave as it reaches π-shift voltage. However, when a 3.6-volt wave is applied, the EOM is overdriven and the optical signal is overmodulated to show side peaks. The top capacitor gap is 1.2 um and the base capacitor gap is 7 um. The modulation length is 7.5 mm.

Figure 12A:
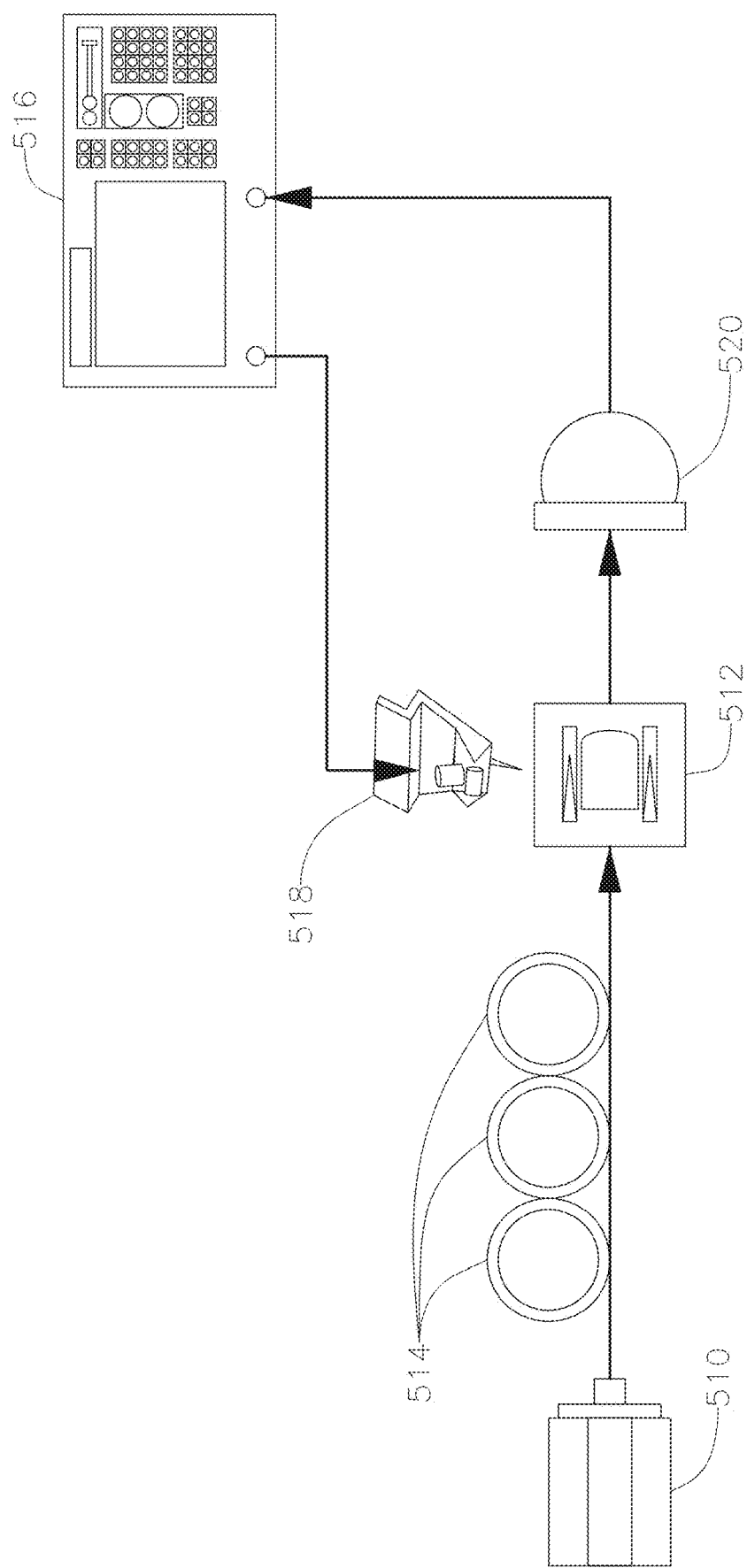
FIG. 12A shows a setup for frequency response measurement in accordance with an embodiment of the present invention.
Figure 12B:
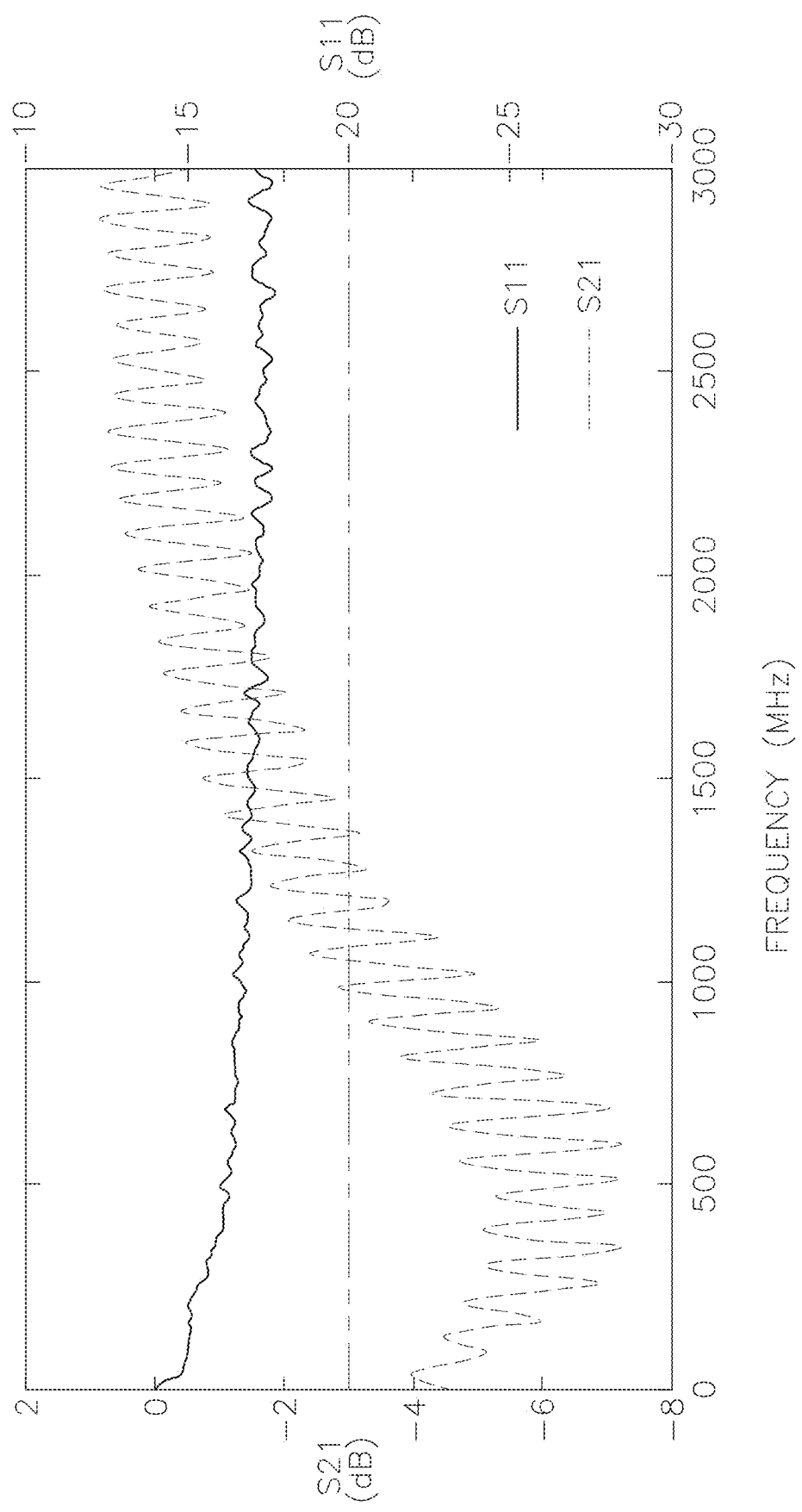
FIG. 12B is a graph illustrating S21 and S11 parameters measured on a 7.5 mm electro-optical modulator using the apparatus of FIG. 12A.

FIG. 12 shows the measurement of frequency response on the 7.5 mm long modulator. As is shown in FIG. 12A, the 1550 nm laser 510 is coupled onto a chip 512 through a polarization controller 514. An electrical signal is generated from a vector network analyzer 516 (VNA) and applied onto the chip 512 using a high-speed probe 518. The light is then coupled through a photodetector 520 to convert the optical signal to an electrical signal and then analyzed by the VNA 516. FIG. 12B plots the S21 and S11 parameters, (i.e., the electro-optical transmission and radio wave reflection). Subtracting the cable loss, the transmission loss was below 2 dB and remained nearly constant up to 3 GHz, which indicates that the 3-dB bandwidth of the device is beyond 3 GHz. On the other hand, S11 is less than −12 dB over the entire frequency range but increases as the frequency increases, signaling potential impedance mismatching at high speeds. In the future, it may be possible to carefully design the buried silicon-oxide layer thickness and the pad width and thickness for a better impedance matching case, for operations beyond 3 GHz.

Figure 13A:
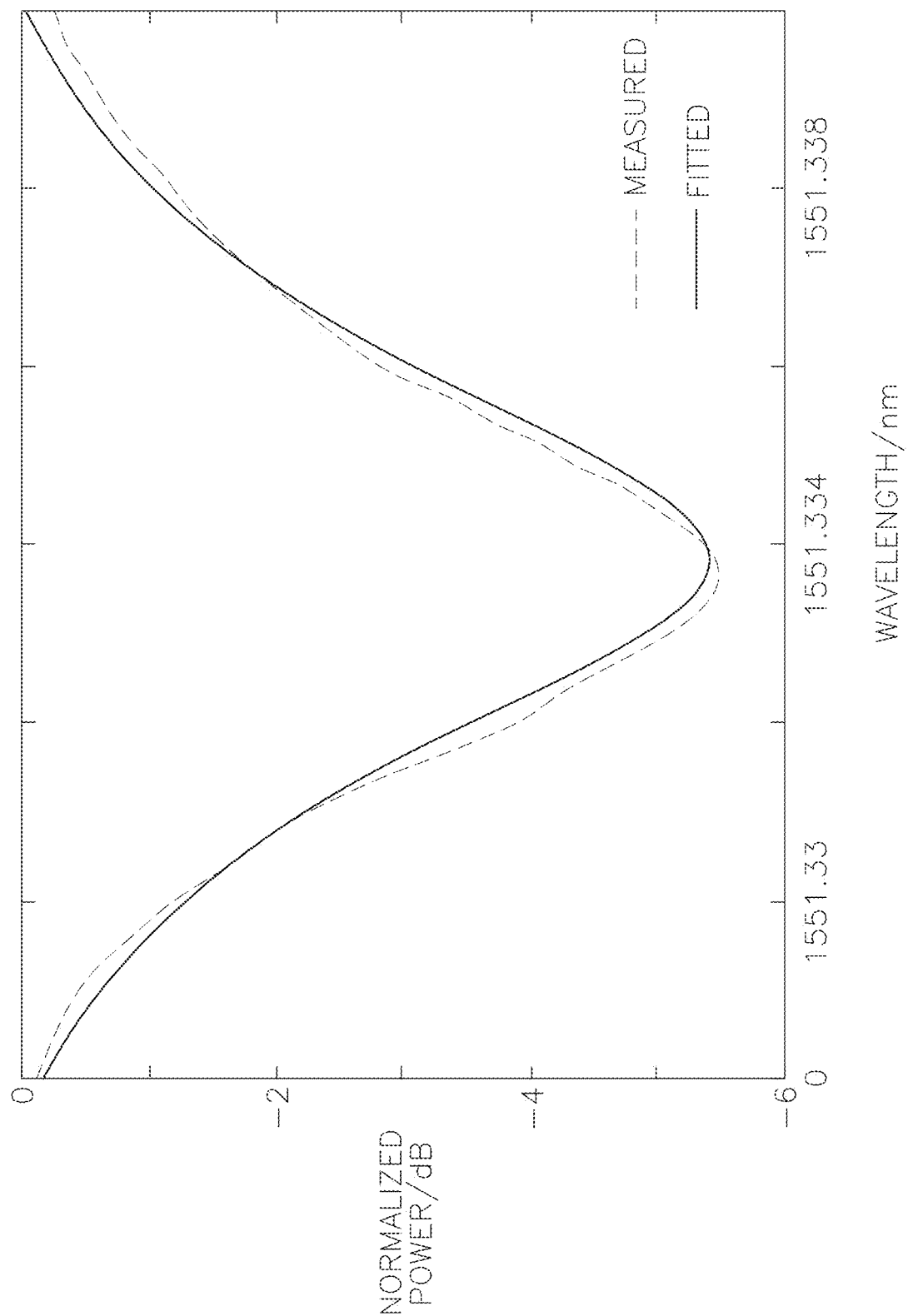
FIG. 13A is a graph of resonance measurements for a bare waveguide.

For many applications, a design consideration is verifying that the dual-capacitor structure does not induce excessive loss. To verify such, the loss was characterized using a long-arm racetrack resonator with the same fabrication recipe. FIGS. 13A and 13B show the resonance measurement of the racetrack-shape waveguide with and without the electrode. The loss caused by the electrode was determined as 0.32 dB/cm. The major loss of the current design was caused by the roughness of the waveguide, which is 1.77 dB/cm. It is feasible to further reduce the waveguide loss by smoothening the waveguide surfaces in the future.

An ultra-low π-shift voltage such as 500 millivolts (mV) or lower can be achieved with 2 cm or longer phase-shifting arms. For ultra-high-speed telecommunication, such as over 100 GHz frequency, or for applications requiring high integration, the footprint of the electro-optic modulator can be further shrunk down to mm size with 2 to 5 volts, which is a CMOS-compatible voltage.

TABLE 1

Π-shift voltages for the EOMs with different top gaps.

| Top gap(um) | Vpi(volts) | Voltage*length(volts*cm) |
|---|---|---|
| 6 | 6.96 | 2.78 |
| 5 | 6.16 | 2.46 |
| 3.2 | 5.28 | 2.11 |
| 2.8 | 4.8 | 1.92 |
| 2.4 | 4.08 | 1.63 |
| 2 | 3.96 | 1.58 |
| 1.6 | 3.74 | 1.50 |
| 1.2 | 3.3 | 1.32 |

In some embodiments, the beam splitters and the beam combiners are implemented by the multimode interferometers and/or the Y-branches. In some embodiments, the width and thickness of the waveguides are changed to achieve the single mode for different optical wavelength or for some other applications.

In some embodiments, the thickness of LN layer will be different from 600 nm, and the etching depth can also be different from 300 nm.

In some embodiments, the dimensions of the waveguides and electrodes can be reduced to work with other optical signals with shorter wavelengths, wherein the half-wavelength voltage (π-shift voltage) can be further reduced several to ten times.

In some embodiments, the gap between electrodes will be changed to balance the absorption loss and electric field density.

In some embodiments, the thickness of the electrodes will be changed.

In some embodiments, the network of such electro-optic modulators and phase shifters can be used to implement some functions like matrix multiplication.

Figure 8:
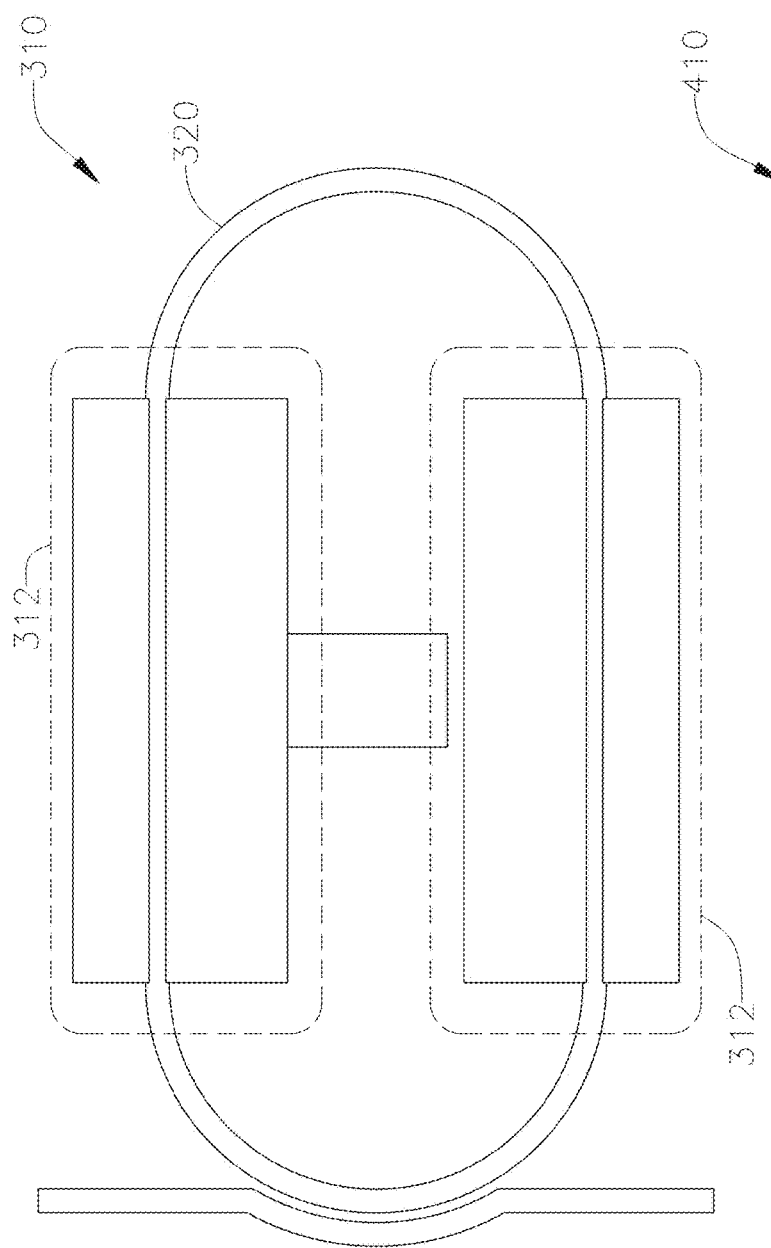
FIG. 8 shows the "racetrack resonator" based electro-optic frequency comb generator in accordance with an embodiment of the present invention.

In some embodiments, the proposed ultra-efficient phase shifter can be implemented in a device 310 for generating an electro-optic frequency comb. As is shown in FIG. 8, such phase shifters 312 can be used in racetrack-shaped microresonator 320 structures to create comb lines. Light circulates multiple times in the racetrack resonator 320. When applying sinusoidal electrical wave onto the phase shifters, which the modulation frequency matches up to with the free spectral range of the resonator 320, the phase of the light will be modulated multiple times and new optical frequency components will be created as the comb lines. Since the frequency conversion efficiency and number of comb lines is significantly limited by the modulation index, which is defined as the ratio of applied peak voltage over π-shift voltage, reducing π-shift voltage using ultra-efficient phase shifter is an application of the present invention.

Figure 9:
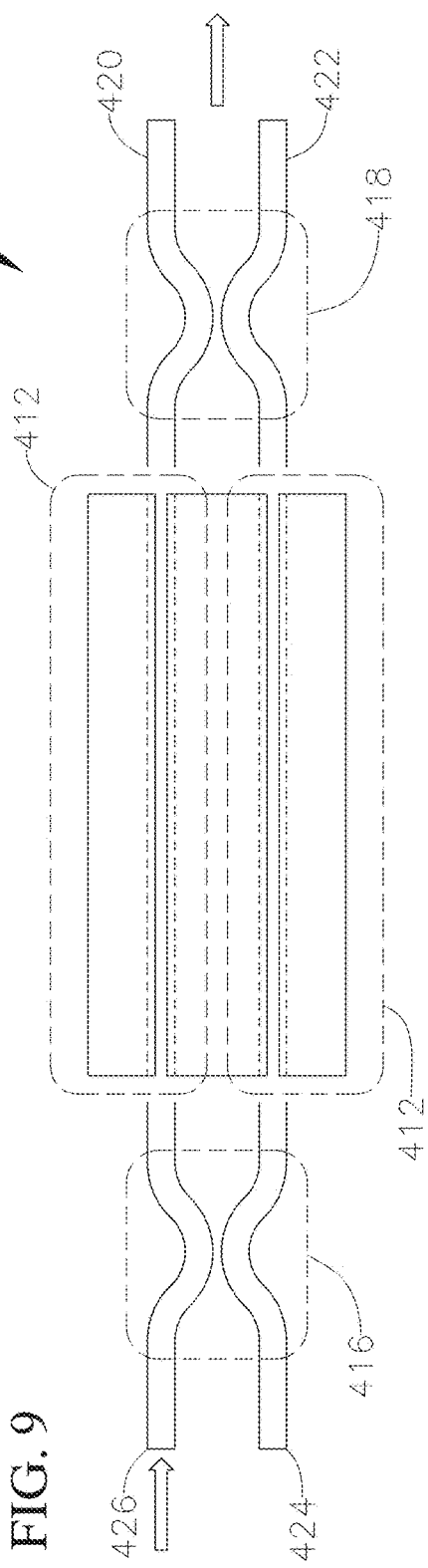
FIG. 9 shows an optical switch structure in accordance with an embodiment of the present invention.

In some embodiments, the proposed ultra-efficient phase shifter can be used to implement the optical switch 410 as is shown in FIG. 9. Such an apparatus would include phase shifters 412, beamsplitter 416 and beam combiner 418. By changing the applied voltage between 0 and π-shift voltage, the output light can be switched between top output port 420 and bottom output port 422.

In some embodiments, several optical switches can be cascaded to realize a multi-port modulator, where there are more than 2 input ports and more than 2 output ports.

In some embodiments, the bottom output port 422 in FIG. 9 can be routed back to a lower input port 424, through a passage waveguide (not shown) that serves as a delay line for the signal. In some embodiments, the passage waveguide is in a spiral structure to extend the length. Using electro-optic effects to control the switch state between the cross and bar states, a signal can be looped for an integer number of times, so that it can be delayed for a discrete time. Here, the cross state means the signal from top input port 426 exits from the bottom output port 422, or bottom input port 424 exits from top output port 420. The bar state means the signal from the top input port 426 exits from the top output port 420 as shown in FIG. 9, and that the signal from the bottom input port 424 exits from the bottom output port 422. This realizes an electro-optically controlled digital delay line, which may be used for quantum communications, quantum computing, and other applications. Because of the ultra-high efficiency in the electro-optical control, many such delay lines can be integrated on the same chip and controlled only with low-voltage, fast electronic signals.

In some embodiments, the high electro-optical modulation efficiency is utilized to detect weak radio waves or microwaves. In one example, the structure in FIG. 8 is used. By applying a stable, continuous wave laser (not shown) to the microring resonator 320, a small radio wave can cause the cavity to be shifted off resonance. By detecting the transmitted optical signal, the radio wave can be detected. In another example, the structure in FIG. 9 is used. By applying a stable, continuous wave laser, a small micro wave can cause the switch 410 to change its switching status, such as changing the power splitting ratio between the two output ports 420, 422. By detecting the transmitted signal in one or both output ports 420, 422, the microwave can be detected. In both examples, the radio waves or microwaves are read out optically. This optical reading has a signal to noise limited by the shot noise of photon counting. By using a strong optical signal, the radio wave/microwave detection sensitivity can be very high, potentially to a single quantum level.

Example Device Configuration and Fabrication

The invented electro-optic modulator is fabricated on a lithium-niobate on-insulator wafer with a 600-nm lithium-niobate thin film which is bonded on top of a 2-micron silicon oxide layer, supported on a 500-micron thick silicon substrate. The complete fabrication process is composed of three stages. The first stage is to the fabricate waveguide structure. The following stage is to fabricate trenches in order to place the gold pads. And the final stage is to fabricate electrodes.

Figure 10A:
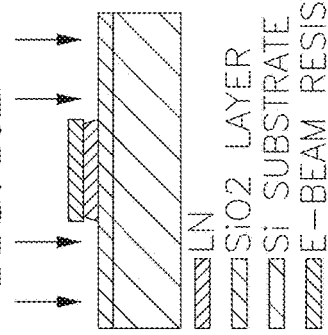
FIG. 10 is a fabrication flowchart for an EOM in accordance with an embodiment of the present invention.
Figure 10B:
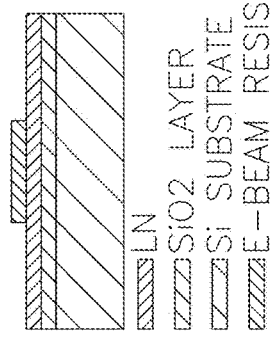
Figure 10E:
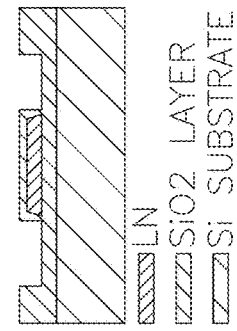

For the first stage in fabricating waveguides, after piranha cleaning (Sulfuric acid:Hydrogen peroxide=3:1) and dehydration, a 10×10 mm size sample (FIG. 10A) is immersed into an adhesion promoter (surpassing 3000) prior to spinning a 800-nm thick layer of E-beam resist (e.g., Hydrogen silsesquioxane; see FIG. 10B). The sample is pre-baked to harden the resist layer prior to E-beam lithography (EBL), which can be done with an Elionix ELS-G100 system, to perform a patterning (FIG. 10C). Following the patterning, the sample undergoes standard resist development and post-bake procedures. Then, the sample is dry etched with Argon milling process using an e-beam evaporator (e.g., AJA Orion 8E Evaporator System; see FIG. 10D) to remove the 300-nm Lithium Niobate layer and leave waveguide structures. The RCA 1 (5:1:1, deionized water, ammonium hydroxide, hydrogen peroxide) solution is used to remove the residual e-beam resist, and sputtering induces redeposited materials after the dry etching. An 800-nm silicon dioxide layer is then deposited by Oxford PECVD as overclad (FIG. 10E).

Figure 10F:
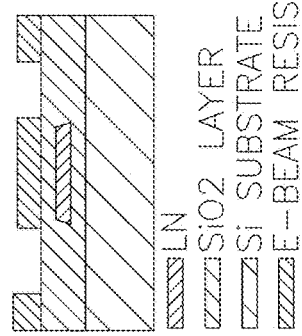
Figure 10I:
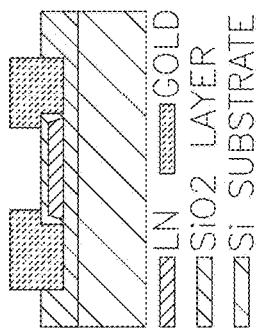
Figure 10J:
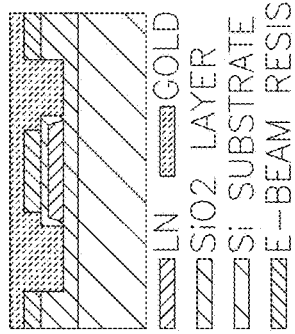

For the second stage, the trenches are defined and etched. A 3-um thick layer of E-beam resist (PMMA 950 A11) is first spun onto the patterned film (FIG. 10F), and E-beam lithography is used to define trench structures (FIG. 10G). After developing by a solution of MIBK:IPA=1:1, the sample is dried and etched with Fluorine gas (FIG. 10H) using, for example, an Oxford Plasmalab-100 Inductively Coupled Plasma (ICP) system, which removes about 800-nm of SiO2 over-cladding layer for the trench structure. Then the residue e-beam resist is removed by acetone solution.

Figure 10L:
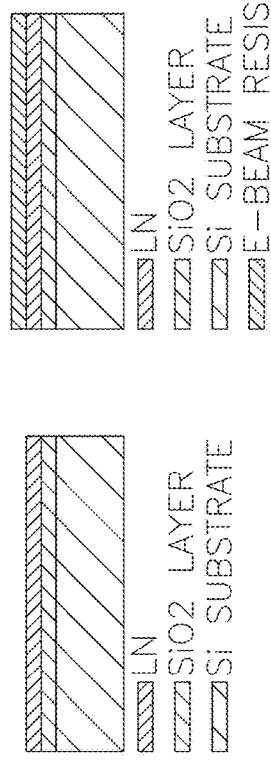

For the final stage, the electrodes are patterned and deposited. The procedure is the same as for the trench (See FIGS. 10I and 10J), but with the E-beam resist of 1.8-um thick layer of PMMA 495 A11 and 0.2-um thick layer of PMMA 950 A4. After developing by the solution, the sample is deposited with 15-nm thick chrome and 300-nm thick gold using an E-beam evaporator (see FIG. 10K). Then a lift-off process is finished by overnight immersion in PG removal solution for complete removal of additional metal layer (FIG. 10L). FIG. 10 shows the general process of the fabrication.

Figure 11C:
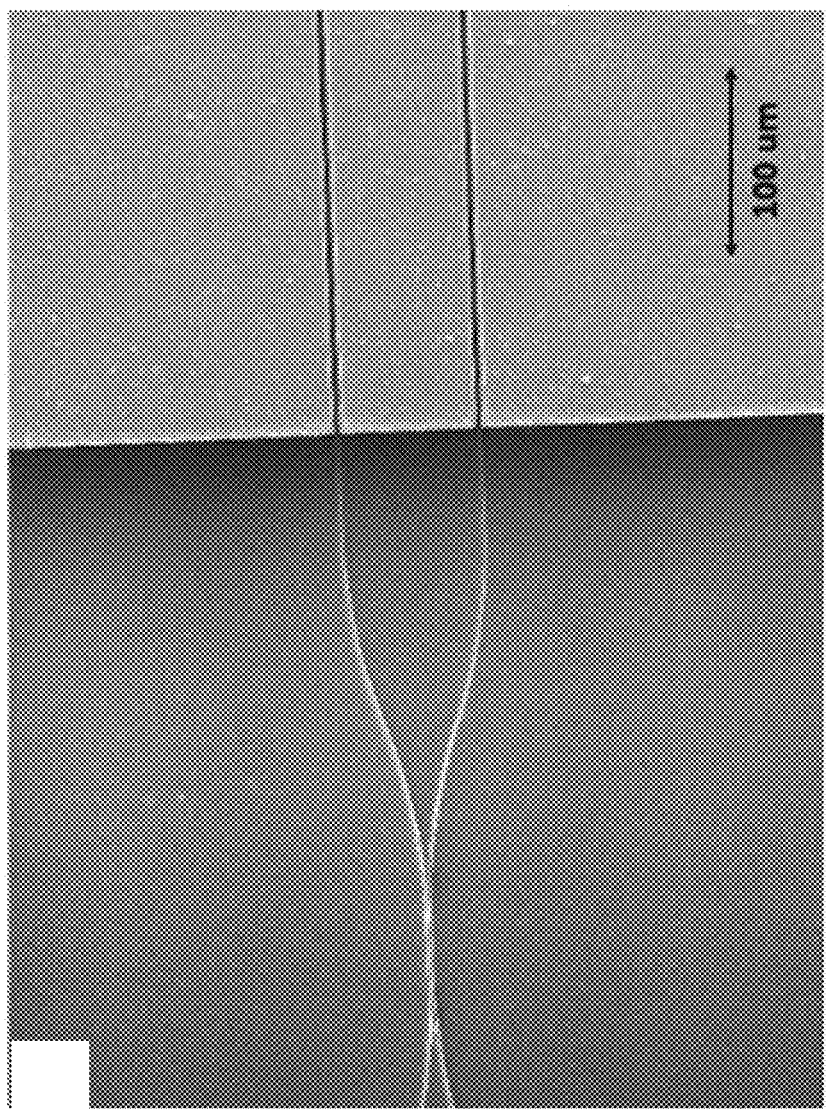
FIG. 11 shows SEM images of an EOM fabricated in accordance with an embodiment of the present invention.
Figure 11A:
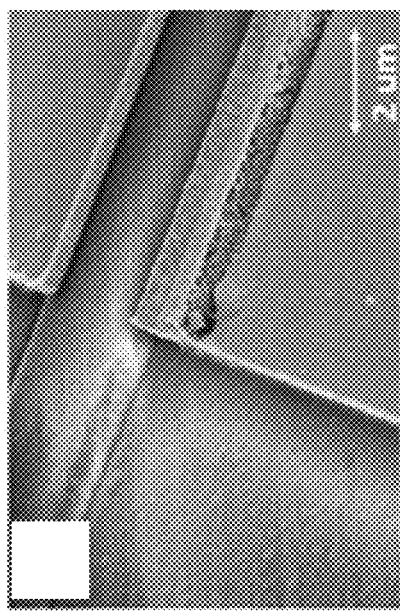
Figure 11B:
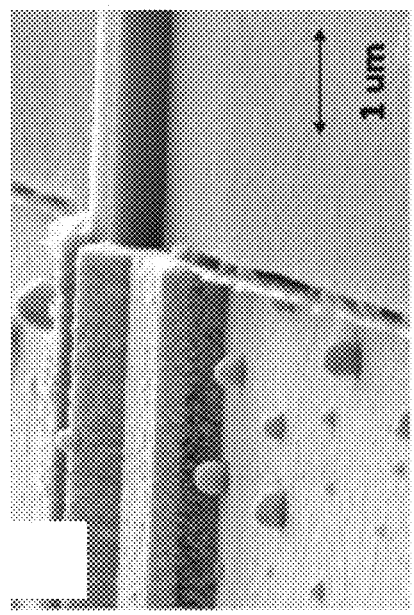

Finally, the chip is cleaved and polished for efficient light coupling. FIG. 11 shows the scanning Electron Microscope (SEM) image of the structure. FIGS. 11A and 11B show that the SiO2-cladded waveguide is surrounded by the gold layer. FIG. 11C shows the top view of the beam splitter and the modulation part.

It will be understood that the embodiments described hereinabove are merely exemplary and that a person skilled in the art may make many variations and modifications without departing from the spirit and scope of the present invention. All such variations and modifications are intended to be included within the scope of the invention as defined in the appended claims.

What is claimed is:

1. An electro-optical modulator, comprising:
a base substrate;
a waveguide having a first surface proximate said base substrate and a second surface opposite said first surface and remote from said base substrate, said waveguide including a ledge projecting from said second surface thereof;
a first electrode, including a first section in contact with said second surface of said waveguide to one side of said ledge thereof, a first joint at an end of said first section proximate said ledge of said waveguide, and a second section extending from said first joint and being offset relative to said first section such that said second section has a terminal end located a first spaced distance from said second surface of said waveguide and a second spaced distance from said ledge of said waveguide;
a second electrode, including a third section in contact with said second surface of said waveguide to an opposite side of said ledge thereof, a second joint at an end of said third section proximate said ledge of said waveguide, and a fourth section extending from said second joint and being offset relative to said third section such that said fourth section has a terminal end located a third spaced distance from said second surface of said waveguide and a fourth spaced distance from said ledge of said waveguide, said fourth section of said second electrode being spaced from said second section of said first electrode by a fifth spaced distance, and said second joint of said second electrode being spaced from said first joint of said first electrode by a sixth spaced distance, which is different than said fifth spaced distance;
a cladding layer having a first portion interposed between said first surface of said waveguide and said base substrate and a second portion interposed between said second surface of said waveguide and said second and fourth sections of said first and second electrodes, respectively;
a first capacitor established by said first and second joints of said first and second electrodes, respectively, upon application of an electrical potential to at least one of said first and second electrodes; and
a second capacitor established by said second and said fourth sections of said first and second electrodes, respectively, upon application of an electrical potential to at least one of said first and second electrodes.

2. The electro-optical modulator of claim 1, wherein said plurality of capacitors comprise a base capacitor and a top capacitor that are connected to form a dual-capacitor structure and create enhanced electromagnetic fields in said waveguide.

3. The electro-optical modulator of claim 1, further comprising:
a beamsplitter at a first end of said modulator; and
a beam combiner at a second end of said modulator, opposite said beamsplitter.

4. The electro-optical modulator of claim 3, wherein said beamsplitter and said beam combiner are each formed from directional couplers.

5. The electro-optical modulator of claim 3, wherein said base and top capacitors partially surround said cladding layer.

6. The electro-optical modulator of claim 3, wherein said beamsplitter and said beam combiner are implemented as multi-mode interferometers.

7. The electro-optical modulator of claim 3, wherein said beamsplitter and said beam combiner are implemented through Y-branches.

8. The electro-optical modulator of claim 3, wherein said beamsplitter and said beam combiner are implemented through anti-symmetrical branches.

9. The electro-optical modulator of claim 1, wherein said waveguide comprises lithium niobate.

10. The electro-optical modulator of claim 1, wherein said first and second electrodes comprise gold in thin films.

11. The electro-optical modulator of claim 1, wherein said cladding layer completely surrounds said waveguide.

12. The electro-optical modulator of claim 1, wherein said cladding layer comprises silicon dioxide.

13. The electro-optical modulator of claim 1, wherein said modulator is configured to operate as a phase shifter.

14. The electro-optical modulator of claim 1, wherein said modulator is configured to modulate the intensity of optical signals.

15. The electro-optical modulator of claim 1, wherein said cladding further comprises a buried layer interposed between said substrate and said waveguide.

16. The electro-optical modulator of claim 1, wherein said waveguide comprises a plurality of arms, and wherein opposite electric fields are applied to two arms of said plurality of arms.

17. The electro-optical modulator of claim 1, wherein said first electrode and said second electrode are coplanar.

18. The electro-optical modulator of claim 1, wherein said modulator forms an optical switch.

* * * * *